United States Patent [19]

Akimoto et al.

[11] Patent Number: 5,708,240
[45] Date of Patent: Jan. 13, 1998

[54] SLIDE SWITCH CONTACT STRUCTURE

[75] Inventors: Hideaki Akimoto; Toshiaki Yokoyama, both of Tokyo, Japan

[73] Assignee: Niles Parts Co., Ltd., Japan

[21] Appl. No.: 630,323

[22] Filed: Apr. 10, 1996

[30] Foreign Application Priority Data

Aug. 7, 1995 [JP] Japan .................. 7-221075

[51] Int. Cl.$^6$ .................................... A01H 13/10
[52] U.S. Cl. ............................................ 200/16 C
[58] Field of Search ....................... 200/5 R, 5 A, 200/5 E, 61.86, DIG. 13, 339, 16 C, 16 B, 441

[56] References Cited

U.S. PATENT DOCUMENTS 4,681,994  7/1987  Nagata et al. ................ 200/16 B

FOREIGN PATENT DOCUMENTS

HEI 6-73836  10/1994  Japan .

Primary Examiner—Aditya Krishnan
Attorney, Agent, or Firm—Ronald P. Kananen

[57] ABSTRACT

A slide switch 1 includes a movable contact 2 that has projections 11 formed thereon for preventing dislocation. The movable contact 2 is inserted together with a spring 8 into a holder 3. The holder 3 has regulating recesses 12, within which the projections 11 of the movable contact 2 can move only vertically. The holder 3 also has claws 9. The movable contact 2 has holes 10 that engage with the claws 9. A pole plate 4 has fixed contacts 5 fixed thereon, on which the movable contact 2 can slide with the holder 3 in compressive contact with the fixed contacts to switch the contact positions. At least one of the fixed contacts 5 is formed with a chamfer 15. Resin guide members 18 are fitted in the centers of slits 17 in the pole plate 4 for preventing the movable contact from falling into the slits. This structure prevents the movable contact of the slide switch from being dislocated when the contact positions of the slide switch are switched, and increases the durability of the slide switch.

11 Claims, 3 Drawing Sheets

SLIDE SWITCH CONTACT STRUCTURE

BACKGROUND OF THE INVENTION

1. Field of the Invention

The present invention relates generally to switches and, in particular, to improvements in slide switch contact structure.

2. Description of the Prior Art

A conventional slide switch includes a holder, into which a spring and a movable contact are inserted. The switch also includes a pole plate having fixed contacts on it, with which the movable contact can compressively contact. By horizontally sliding the holder, the contact positions are switched to load or unload various electrical equipments.

In the prior art slide switch shown in FIG. 4, however, if the movable contact 31 is inserted together with the spring 32 into the holder 33, both side walls of the movable contact 31 deform slightly outward, as shown by phantom lines 36, when the claws 34 on both sides of the holder 33 engage with the holes 35 in the side walls of the movable contact 31. As shown in FIG. 5, if the contact positions are switched horizontally, the movable contact 31 and holder 33 are dislocated from each other in the sliding direction, as indicated by reference numeral 37, so that the contact positions are dislocated.

In addition, the pole plate 38 of the prior art has fixed contacts 39 and slits 40 for arc absorption between adjacent fixed contacts 39. The fixed contacts 39 are cut at a right angle at the slits 40. As a result, the edges wear due to arcs or electrical wear when the contact positions are switched under a high load. Consequently, while the movable contact 31 is sliding, it may fall into the slits 40 or may be caught by the resin guide members 41, which are for preventing the movable contact 31 from falling, or may otherwise malfunction, so that the durability is lowered.

The conventional slide switch contact structure shown in FIGS. 4 and 5 is disclosed in Japanese Unexamined Utility Model Publication HEI 6-73836, for example.

SUMMARY OF THE INVENTION

An object of the present invention is to solve the problems associated with the conventional slide switch structure described above.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, the movable contact of a slide switch is formed with a projection for preventing dislocation in the sliding direction. The holder to which the movable contact is fitted is formed with a regulating recess, in which the projection of the movable contact can move only vertically. A fixed contact on the pole plate with which the movable contact slidably contacts is formed with a chamfer for preventing wear. A resin guide member is fitted in the center of the slit between contacts of the pole plate. It is therefore possible to prevent dislocation when the contact positions are switched, and to increase the durability of the slide switch.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE PREFERRED EMBODIMENT

A preferred embodiment of the present invention will be described in detail hereinafter with reference to FIGS. 1 to 3.

Figure 1:
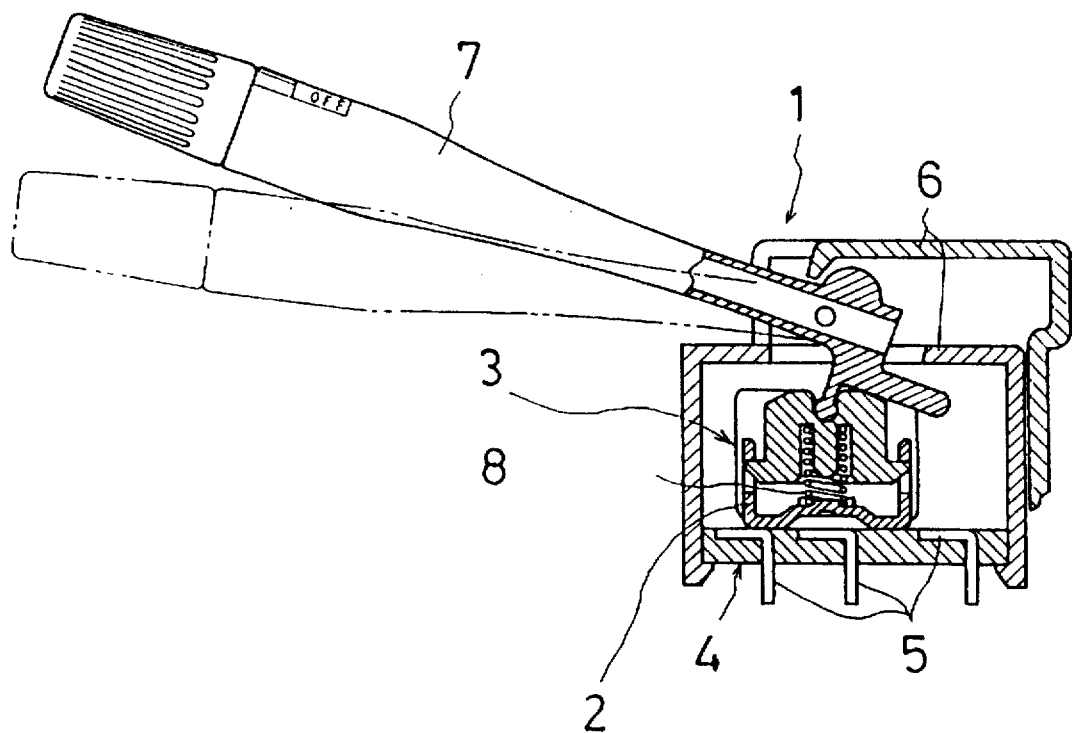
FIG. 1 is a schematic view showing the structure of a slide switch according to the present invention that operates by manipulating a lever.
Figure 2:
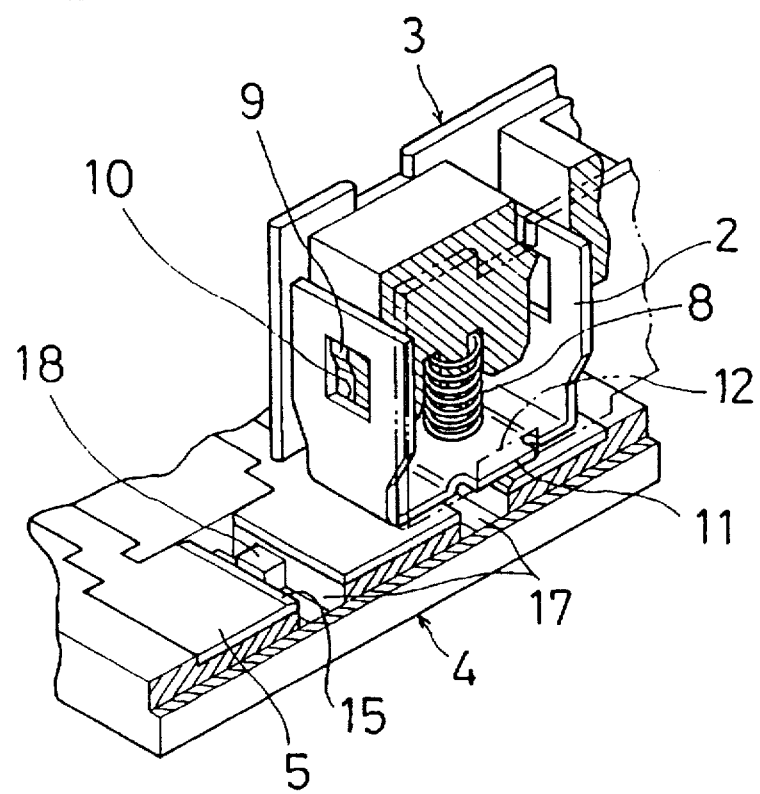
FIG. 2 is a fragmentary perspective view showing a movable contact of the slide switch according to the present invention inserted into a holder and part of a pole plate.
Figure 3:
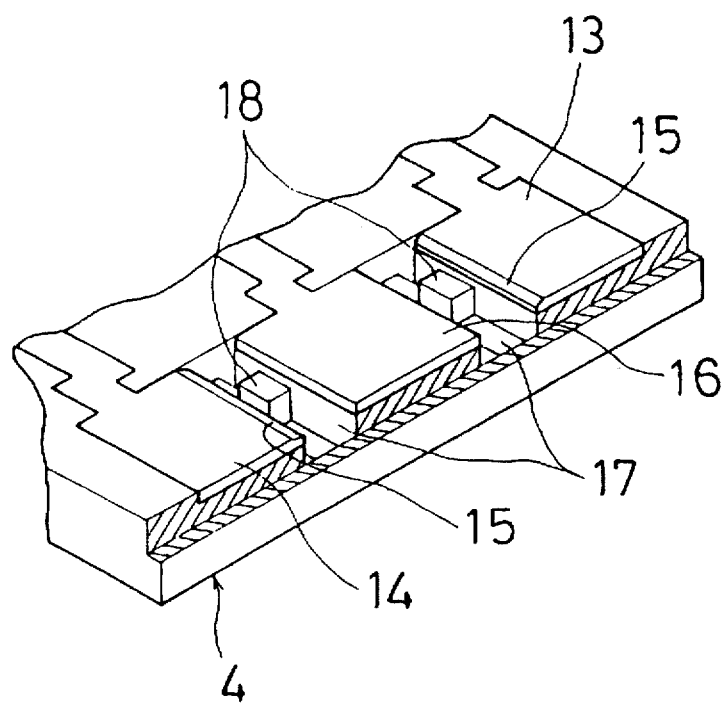
FIG. 3 is a fragmentary perspective view of the pole plate according to the present invention.
Figure 4:
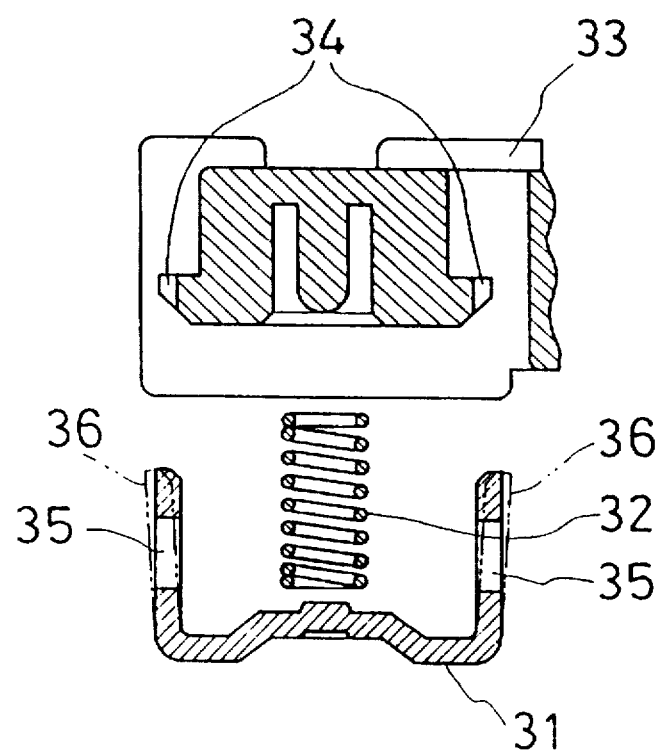
FIG. 4 is an exploded perspective view of the movable contact and holder of a prior art slide switch.
Figure 5:
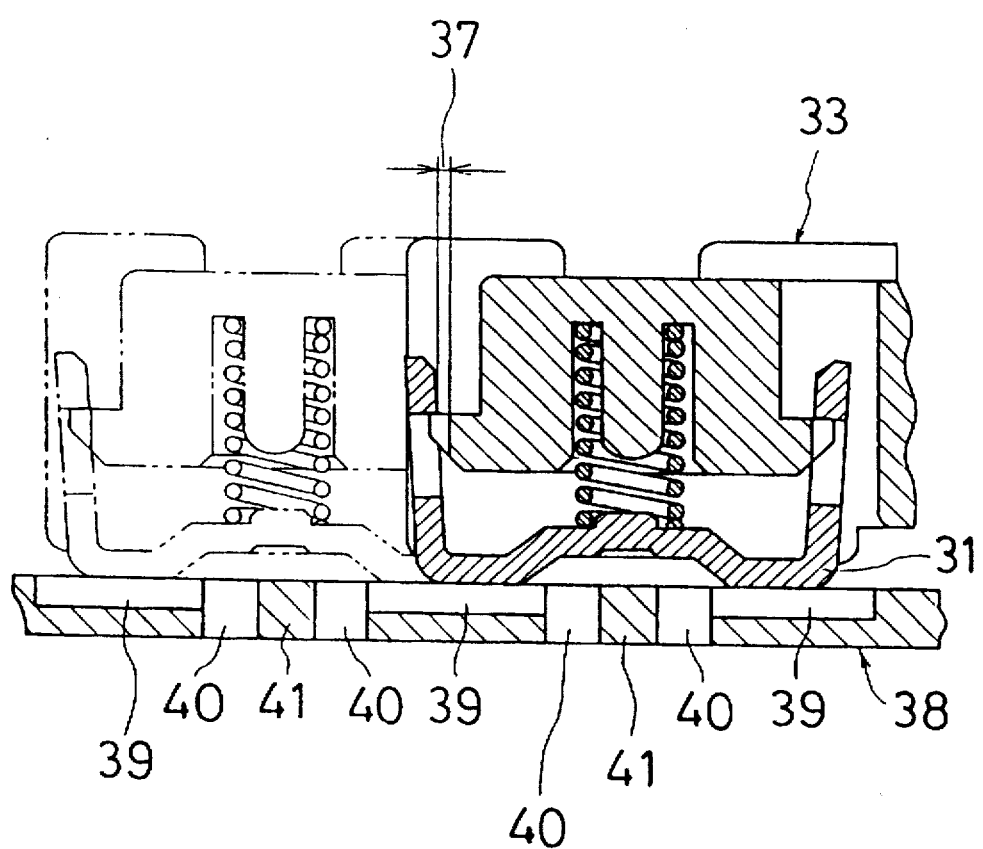
FIG. 5 is a cross-sectional view showing a pole plate and the dislocation between the movable contact and the holder of the prior art slide switch.

FIGS. 1 to 3 show a slide switch contact structure according to an embodiment of the present invention. FIG. 1 shows a slide switch 1 that operates by manipulating a lever 7. The slide switch 1 comprises a case 6 containing a holder 3, into which a movable contact 2 and a spring 8 are inserted, and a pole plate 4 having fixed contacts 5. By manipulating the lever 7 up and down, the movable contact 2 is slid horizontally together with the holder 3 to switch the contact positions.

By inserting the movable contact 2 of the slide switch 1 together with the spring 8 into the holder 3 from below, as shown in FIG. 2 and similarly to the conventional switch, the claws 9 on both sides of the holder 3 engage with the holes 10 in both side walls of the movable contact 2. Upon assembly, the movable contact 2 engages with the holder 3 so as to be movable relative to the holder 3 in a vertical direction only.

While the movable contact 2 inserted with the spring 8 into the holder 3 is pressed against fixed contacts 5 on the pole plate 4, the lever 7 is manipulated to slide the holder 3 horizontally, so that the contact positions are switched to load or unload various electrical equipments.

The movable contact 2 has projections 11 formed on both sides that prevent the movable contact 2 and holder 3 from being dislocated relative to each other when the movable contact 2 slides to switch the contact positions. The holder 3 has regulating recesses 12 formed in the centers of both sides at the bottom, as shown by dashed lines in FIG. 2, so that the projections 11 of the movable contact 2 can move relative to the holder 3 in a vertical direction only.

Because the regulating recesses 12 of the holder 3 and the projections 11 of the movable contact 2 can slide in movable engagement relative to each other only in the vertical direction, the movable contact 2 and the holder 3 are not dislocated relative to each other when the contact positions are switched. Therefore, the slide switch 1 can precisely switch the contact positions between the movable contact 2 and the fixed contacts 5.

As shown in FIG. 3, the base 4 has three fixed contacts 13, 14 and 16 fixed thereto. The first fixed contact 13 and the second fixed contact 14 each have a chamfer 15 formed to reduce the resistance when the movable contact 2 slides. Two slits 17 for arc absorption are formed between the first and third fixed contacts 13 and 16, and between the second and third fixed contacts 14 and 16, respectively. Fixed in the center of each slit 17 is a resin guide member 18 for preventing the movable contact 2 from falling into the slit 17.

The slide switch 1 with the holder 3, movable contact 2 and base 4 constructed as stated above can precisely switch the contact positions. The slide switch also reduces the occurrence of edge wear due to arcs or electrical wear when the contact positions are switched under a high load, so that the movable contact 2 is prevented from falling into the slits 17, from being caught by the resin guide members 18, or from otherwise malfunctioning, in order to increase the durability.

The slide switch contact structure can switch the contact positions securely without dislocation in the direction in which the movable contact slides, because the movable contact and holder are not dislocated relative to each other when the holder is slid together with the movable contact by the operation to switch the contact positions as stated above. In addition, by forming the chamfers on fixed contacts on the pole plate to reduce the resistance during the slide, and fitting the resin guide members in the centers of the slits in the pole plate to prevent the movable contact from falling, it is possible to reduce the edge wear due to arcing or electrical wear when the contacts are switched under a high load, and to prevent the movable contact from falling into the slits, from being caught by the resin guide members while it is sliding, or from otherwise malfunctioning, in order to increase the durability.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

We claim:

1. A slide switch contact structure, comprising:
   a holder having first and second claws formed on opposite sides of the holder, respectively;
   a movable contact having first and second upstanding side walls and a bottom wall extending between said upstanding side walls, said bottom wall having a lower contact surface for slidably engaging a fixed contact, said first and second upstanding side walls each having a hole for receiving said first and second claws, respectively;
   said bottom wall having at least one projection extending in a lateral direction for preventing dislocation of the movable contact relative to the holder in a sliding direction;
   wherein said holder comprises a regulating recess that receives said at least one projection.

2. The slide switch contact structure according to claim 1, wherein said holder and said movable contact are movable together in a first sliding direction relative to the fixed contact, a dimension of said regulating recess in said first sliding direction being generally the same as a dimension of said at least one projection in said first sliding direction for preventing movement of the movable contact relative to the holder in said first sliding direction.

3. A slide switch contact structure comprising:
   a holder having first and second claws formed on opposite sides of the holder, respectively;
   a movable contact having first and second upstanding side walls and a bottom wall extending between said upstanding side walls, said bottom wall having a lower contact surface for slidably engaging a fixed contact, said first and second upstanding side walls each having a hole for receiving said first and second claws, respectively;
   said bottom wall having at least one projection extending in a lateral direction for preventing dislocation of the movable contact relative to the holder in a sliding direction;
   wherein said at least one projection extending from the bottom wall comprises first and second projections extending in opposite lateral directions from opposite lateral sides of said bottom wall, and said holder comprises first and second regulating recesses for receiving said first and second projections, respectively.

4. The slide switch contact structure according to claim 3, wherein said holder and said movable contact are movable together in a first sliding direction relative to the fixed contact, a dimension of said first and second regulating recesses in said first sliding direction being generally the same as a dimension of said first and second projections in said first sliding direction, respectively, for preventing movement of the movable contact relative to the holder in said first sliding direction.

5. A slide switch contact structure, comprising:
   a holder having first and second claws formed on opposite sides of the holder, respectively;
   a movable contact having first and second upstanding side walls and a bottom wall extending between said upstanding side walls, slid bottom wall having a lower contact surface for slidably engaging a fixed contact, said first and second upstanding side walls each having a hole for receiving said first and second claws, respectively;
   said bottom wall having at least one projection extending in a lateral direction for preventing dislocation of the movable contact relative to the holder in a sliding direction;
   wherein said movable contact is a resilient plate spring member, and said upstanding side walls are integral with said bottom wall.

6. A slide switch contact structure, comprising:
   a holder having first and second claws formed on opposite sides of the holder, respectively;
   a movable contact having first and second upstanding side walls and a bottom wall extending between said upstanding side walls, said bottom wall having a lower contact surface for slidably engaging a fixed contact, said first and second upstanding side walls each having a hole for receiving said first and second claws, respectively;
   said bottom wall having at least one projection extending in a lateral direction for preventing dislocation of the movable contact relative to the holder in a sliding direction;
   wherein said at least one projection is integral with the bottom wall of said movable contact and extends in a direction that is normal to said upstanding side walls and to a sliding direction of said movable contact and said holder relative to the fixed contact.

7. A slide switch contact structure, comprising:
   a holder having first and second claws formed on opposite sides of the holder, respectively;
   a movable contact having first and second upstanding side walls and a bottom wall extending between said upstanding side walls, said bottom wall having a lower contact surface for slidably engaging a fixed contact, said first and second upstanding side walls each having a hole for receiving said first and second claws, respectively;

said bottom wall having at least one projection extending in a lateral direction for preventing dislocation of the movable contact relative to the holder in a sliding direction;

wherein said movable contact is movable relative to said holder only in a direction normal to a plane containing the lower contact surface of the bottom wall.

8. A slide switch contact structure, comprising:

a holder having first and second claws formed on opposite sides of the holder, respectively;

a movable contact having first and second upstanding side walls and a bottom wall extending between said upstanding side walls, said bottom wall having a lower contact surface for slidably engaging a fixed contact, said first and second upstanding side walls each having a hole for receiving said first and second claws, respectively;

said bottom wall having at least one projection extending in a lateral direction for preventing dislocation of the movable contact relative to the holder in a sliding direction;

further comprising a pole plate supporting a plurality of fixed contacts, said lower contact surface of said movable contact slidably contacting said fixed contacts.

9. The slide switch contact structure according to claim 8, wherein at least one of said fixed contacts has a chamber for preventing wear.

10. The slide switch contact structure according to claim 9, further comprising a slit located between said fixed contacts, and a resin guide member being fitted in a center of said slit for preventing the movable contact from falling into said slit.

11. A slide switch contact structure, comprising:

a holder having first and second claws formed on opposite sides of the holder, respectively;

a movable contact having first and second upstanding side walls and a bottom wall extending between said upstanding side walls, said bottom wall having a lower contact surface for slidably engaging a fixed contact, said first and second upstanding side walls each having a hole for receiving said first and second claws, respectively;

said bottom wall having at least one projection extending in a lateral direction for preventing dislocation of the movable contact relative to the holder in a sliding direction;

further comprising a spring disposed between said movable contact and said holder for biasing said movable contact into engagement with said fixed contact.

* * * * *